United States Patent
Gayer et al.

(10) Patent No.: US 8,037,114 B2
(45) Date of Patent: Oct. 11, 2011

(54) METHOD FOR CREATING A REPRESENTATION OF A CALCULATION RESULT LINEARLY DEPENDENT UPON A SQUARE OF A VALUE

(75) Inventors: Marc Gayer, Erlangen (DE); Manfred Lutzky, Nuremberg (DE); Markus Lohwasser, Hersbruck (DE); Sascha Disch, Fuerth (DE); Johannes Hilpert, Nuremberg (DE); Stefan Geyersberger, Wuerzburg (DE); Bernhard Grill, Lauf (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 1153 days.

(21) Appl. No.: 11/762,690

(22) Filed: Jun. 13, 2007

(65) Prior Publication Data

US 2007/0276889 A1    Nov. 29, 2007

Related U.S. Application Data

(63) Continuation of application No. PCT/EP2005/013383, filed on Dec. 13, 2005.

(30) Foreign Application Priority Data

Dec. 13, 2004    (DE) .......................... 10 2004 059 979

(51) Int. Cl.
*G06F 15/00*    (2006.01)
(52) U.S. Cl. ........................................................ 708/200
(58) Field of Classification Search .................. 708/200, 708/201
See application file for complete search history.

(56) References Cited

U.S. PATENT DOCUMENTS

| | | | |
|---|---|---|---|
| 5,197,024 | A | 3/1993 | Pickett |
| 5,570,454 | A | 10/1996 | Liu |
| 5,608,663 | A | 3/1997 | Smith |
| 5,764,698 | A | 6/1998 | Sudharsanan et al. |

(Continued)

FOREIGN PATENT DOCUMENTS

EP    1455344    9/2004

(Continued)

OTHER PUBLICATIONS

Kim, Do Hyoung et al.; "Optimization of MPEG-4 GA AAC on general PC"; Aug. 14, 2001; Proc. Of the 44th IEEE Midwest Symposium on Circuits and Systems (MWSCAS) Dayton OH, vol. 2, 14, pp. 923-925.

(Continued)

*Primary Examiner* — Chuong Ngo
(74) *Attorney, Agent, or Firm* — Michael A. Glenn; Glenn Patent Group

(57) ABSTRACT

In the transition into the logarithmic range, not the entire bit width of the result linearly dependent upon the square of the value must be considered. Rather, it is possible to scale the result of a value with x bits such that a representation with less than x bits of the result is sufficient to receive the logarithmic representation based thereon. The effect of the scaling factor on the resulting logarithmic representation may be compensated for by adding or subtracting a correction value received by the logarithm function applied to the scaling factor to or from the scaled logarithmic representation without any loss of dynamics. This way, a method and an apparatus for creating a representation of a result linearly dependent upon a square of a value are provided so that the calculation is simple and/or possible with little hardware expenditure.

23 Claims, 6 Drawing Sheets

U.S. PATENT DOCUMENTS

| | | | |
|---|---|---|---|
| 6,341,300 B1 | 1/2002 | Shankar et al. | |
| 6,351,730 B2 | 2/2002 | Chen | |
| 6,460,063 B1 | 10/2002 | Mitsushita | |
| 6,718,019 B1 * | 4/2004 | Heidari et al. | 379/93.05 |
| 6,728,739 B1 | 4/2004 | Kobayashi | |
| 6,732,071 B2 | 5/2004 | Lopez-Estrada et al. | |
| 6,754,618 B1 | 6/2004 | Konstantinides et al. | |

FOREIGN PATENT DOCUMENTS

| | | |
|---|---|---|
| JP | 61188624 | 8/1986 |
| JP | H07-143010 | 6/1995 |
| JP | H09-134200 | 5/1997 |
| JP | H11-507743 | 7/1999 |
| JP | 2000-151414 | 5/2000 |
| RU | 2185024 C2 | 7/2002 |
| WO | WO 86/03872 | 7/1986 |
| WO | WO 99/50828 | 10/1999 |
| WO | WO 03/088212 | 10/2003 |
| WO | WO 2004/013839 | 2/2004 |
| WO | WO 2006/063797 | 6/2006 |

OTHER PUBLICATIONS

Chhabra, Arun, et al., "A Block Floating Point Implementation on the TMS320C54x DSP," Dec. 1999, Texas Instruments Application Report, XP007903070.

Russian Decision to Grant dated mailed Jun. 1, 2009 for parallel application No. 2007126655/09(029015); English translation provided.

Arun Chhabra, et al., "A Block Floating Point Implementation on the TMS320C54x DSP," Dec. 1999, Texas Instruments, XP007903070, pp. 1-74.

* cited by examiner

METHOD FOR CREATING A REPRESENTATION OF A CALCULATION RESULT LINEARLY DEPENDENT UPON A SQUARE OF A VALUE

CROSS-REFERENCE TO RELATED APPLICATIONS

This application is a continuation of copending International Application No. PCT/EP2005/013383 filed Dec. 13, 2005, which designated the United States and was not published in English.

TECHNICAL FIELD

The present invention relates to the creation of a representation of a calculation result linearly dependent upon a square of a value, such as a sum of squares of a group of values as is necessitated, for example, in some audio encoders, in which according to a psychoacoustic model frequency lines are combined to form frequency groups in order to perform the further encoding by means of the signal energies of the frequency groups.

BACKGROUND

In modern, filterbank-based audio encoding methods, such as MPEG Layer-3 or MPEG AAC, a psychoacoustic model is used in the encoder. In this psychoacoustic model, the total spectrum of the audio signal transformed into the frequency range is divided into individual frequency groups of varying widths and/or varying numbers of frequency lines per frequency group. For the calculation of the psychoacoustic listening thresholds, for the decision if center/side stereo encoding should be used, and for the evaluation and/or calculation of the scale factors in the quantization module of the audio encoder, the signal energies of the audio signal portions in the individual frequency groups are calculated in the psychoacoustic model. This is effected by squaring each individual frequency line, resulting in the line energies, and subsequent summation of all line energies in a frequency group to form the band energy of a frequency group, of which there may be about 40 to 60 per audio channel in the case of for example MPEG AAC.

In the following, the special application of an implementation of such a method in a fixed-point processor shall be considered.

In fixed-point representation, the frequency lines are represented with a word width of for example 24 bits or 32 bits. A word width of only 16 bits is not sufficient. A global scaling factor or a shifting factor is used, which applies to all frequency lines of an audio channel and also to all frequency lines of all audio channels processed in an encoder, and which determines by how many positions each frequency line value must be shifted to the left or the right so that the original scaling may again be obtained, which is referred to as block-floating-point representation. This is to say that all frequency lines of at least one audio channel are equally gated out and/or are on the same scaling level. In consideration of the generally high dynamics of the individual amplitudes of the frequency lines, this has some of the frequency lines represented with relatively high accuracy, such as for example 22 valid bits with a word width of 24 bits or 30 valid bits with a word width of 32 bits, whereas others are represented with only few valid bits and therefore rather inaccurately.

In the implementation of the above-mentioned filterbank-based audio encoding method in a fixed-point processor, problems as described below will arise.

Firstly, the problems concern the representation of the signal energies themselves. By means of the squaring, the signal energies, that is the summed up squares of the frequency lines, have obtained dynamics double those of the frequency lines if the total accuracy is to be maintained.

There are indeed various possibilities to represent the signal energies. One possibility is the representation of the signal energies by a data type having a word width double that of the data type used for the representation of the frequency lines, that is for example a data type with a width of 48 bits or 64 bits. Imagine, for example, a frequency line with 22 valid bits represented by a 24-bit data type. Based on the summation, the signal energy would, together with the other frequency lines, have at least 44 valid bits and would be represented in a 48-bit data type. This procedure, however, is not feasible at least for 64-bit energies, that is in cases, in which the frequency lines are represented in a 32-bit data type, as most conventional fixed-point processors either do not support a 64-bit data type at all or else memory access operations and calculations using a 64-bit data type are extremely slow compared to, for example, 32-bit access operations and calculations. In addition, memory consumption is significantly higher in the case of 64-bit data.

Another possibility of the representation of the signal energies is the representation by a floating-point data type by means of mantissa and exponent. Again assume the above-mentioned exemplary case that a frequency line with 22 valid bits it represented in a 24-bit data type. The signal energy of the respective group would then be represented in a standardized or proprietary floating-point data type with 16-bit mantissa including sign bit and 8-bit exponent. Here, it is immaterial if a standardized floating-point data type, such as IEEE-P754, or a proprietary floating-point data type with arbitrarily chosen mantissa and exponent widths, is concerned. On a fixed-point processor without a floating-point calculating unit, calculations with floating-point data types will have to be emulated by several calculation steps and will therefore be extremely slow, so that this procedure is not feasible.

A further problematic field in the implementation of the above-mentioned filterbank-based audio encoding method in a fixed-point processor is the reprocessing of the signal energies in the course of the encoding method. The signal energies and the listening thresholds derived therefrom are used in the further routine of the audio encoder at numerous different places in the algorithm, for example in order to calculate ratios or quotients, for example between signal energy and listening threshold. The necessitated division is not easy to perform on a fixed-point processor.

One possibility of performing a division on a fixed-point processor is the use of single-bit division commands, which are implemented in some fixed-point processors and supply an additional bit of accuracy in the quotient per call. For a division with an accuracy of for example 48 bits, 48 individual division commands for one single division of two signal energies or a signal energy and a listening threshold would therefore be necessitated. This is not feasible and very inefficient because of the high calculating time expenditure involved.

Another possibility of implementing a division in a fixed-point processor is the use of tables, possibly in connection with subsequent iteration steps for increasing the accuracy of the division results. This procedure, however, is often not feasible as for the necessitated accuracy of the division result, either a very large table must be used or subsequent iteration steps will in turn have a high demand for calculating time.

Both methods mentioned may be used in a fixed-point processor in connection with fixed-point data types or floating-point data types emulated per software, which, however, in none of the cases provides for a sufficiently efficient application with respect to calculating time and memory consumption with simultaneous result accuracy.

The above-mentioned problems would not occur if a GPP (General Purpose Processor) were used. For many applications, however, the use of processors having a higher performance than fixed-point processors without a floating-point calculating unit is automatically out of the question because of the high pricing pressure and the high number of pieces. Examples of such applications are mobile phones and PDAs.

U.S. Pat. No. 6,754,618 B1 responds to the problem of the SMR calculation, that is the calculation of the ratio between signal energy and listening threshold, and does so against a backdrop of the use of fixed-point DSP chips. In accordance with the procedure proposed therein, first the usual windowing and subsequent Fourier transformation for the decomposition of an audio signal into its spectral constituents is performed, following which the energy of each input signal and/or frequency line signal, that is, the line energy, is calculated from the real and imaginary portions of the respective frequency line value. Without going further into the creation of signal energies of the groups of frequency lines, the method could also be continued based on the signal energies of these groups. The content of this document is the attempt to remove the problem that the input data, that is the energies, mostly have dynamic range that is too large, as most fixed-point DSP chips comprise a data width of only 16 to 24 bits, whereas the MPEG standard would necessitate a data width of 34 bits, that is a dynamic range of 101 dB. Therefore, the energies would first have to be scaled. In particular, a proposition is made to digress from the former procedure and use two different scaling values. More precisely, in accordance with this document, the energy is compared to a threshold and scaled upward or downward, respectively, in order to be able to represent the logarithm result with sufficient 16 bits at a transition into a logarithmic range, and in order to be able to calculate the SMR ratio in the logarithmic range with 16 bits. Depending on whether an upward or a downward scaling is performed, a different table for the thresholds is used. For taking the logarithm, a common logarithm times 10 is used, so that the unit dB will be obtained. If the result of taking the logarithm of the upwardly scaled line energies is zero, the SMR ratio will be calculated by taking the logarithm of the upwardly scaled line energy minus the logarithm of the threshold energy times 10. Otherwise, the results of the upwardly scaled line energy and of the downwardly scaled line energy are combined with each other.

The procedure proposed in U.S. Pat. No. 6,754,618 B1 avoids some of the above-mentioned problems with respect to the reprocessing of the signal energies by proposing to calculate the SMR ratio in the logarithmic range. This removes the complex division calculation. This procedure, however, is disadvantageous in that the logarithm calculation is still relatively complex as the value range for a 16-bit fixed-point representation as suitable for 16-bit DSP fixed-point processors, is laid out only after the logarithm calculation, while the taking of the logarithm as such is still performed on the energies present with high dynamics, which results in the necessity of as much as two takings of the logarithm per energy value.

It is therefore desirable to simplify the transition into the logarithmic range also, without there occurring a loss in dynamics.

U.S. Pat. No. 5,608,663 deals with the fast execution of parallel multiplications of floating-point numbers by means of conversion into a logarithmic fixed-point format, addition in the logarithmic range and subsequent back conversion.

U.S. Pat. No. 5,197,024 generally deals with an exponential/logarithm calculation and a respective apparatus.

U.S. Pat. No. 6,732,071 deals with an efficient solution for a rate control in audio encoding, and for the determination of the quantization parameter value uses a loop iteration with a completion condition, according to which the quantization parameter value is compared to a term derived from a logarithm dualis of a term depending on a maximum frequency line value.

U.S. Pat. No. 6,351,730 describes the use of a logarithm dualis for a gain calculation within audio encoding. The gain values are used for the bit allocation in an MDCT-encoded audio codec.

U.S. Pat. No. 5,764,698 describes the use of a natural logarithm for the representation of audio signal energies. A more detailed description of the transition into the logarithmic range is not given.

SUMMARY

According to an embodiment, an apparatus for calculating a signal energy of an information amplitude signal may have: a transformer for decomposing an information amplitude signal into spectral values present in an x-bit representation with the logarithm not taken; a processor for performing a squaring at the x-bit representation with the logarithm not taken of each spectral value in order to receive a respective squared spectral value, and a summation at the squared spectral values in order to receive a sum of squares as a calculation result in a y-bit representation with the logarithm not taken, wherein the processor is adapted such that the representation with the logarithm not taken of the calculation result is scaled with the effective scaling factor compared to the sum of squares; a logarithm taker for applying a logarithm function to y bits of the representation with the logarithm not taken of the calculation result in order to receive a scaled representation with the logarithm taken of the calculation result, wherein y is less than or equal to 2 times x; and a rescaler for adding or subtracting a correction value to or from respectively the scaled logarithmic representation, the value corresponding to the logarithm function applied to the effective scaling factor, in order to receive a representation with the logarithm taken of the calculation result as the signal energy.

According to another embodiment, an audio encoder may have: an apparatus for calculating spectral group signal energies of an information amplitude signal so that the spectral group signal energies have the same scaling level, with an apparatus for calculating a signal energy of an information amplitude signal, having; a transformer for decomposing an information amplitude signal into spectral values present in an x-bit representation with the logarithm not taken; a processor for performing a squaring at the x-bit representation with the logarithm not taken of each spectral value in order to receive a respective squared spectral value, and a summation at the squared spectral values in order to receive a sum of squares as a calculation result in a y-bit representation with the logarithm not taken, wherein the processor is adapted such that the representation with the logarithm not taken of the calculation result is scaled with the effective scaling factor compared to the sum of squares; a logarithm taker for applying a logarithm function to y bits of the representation with the logarithm not taken of the calculation result in order to receive a scaled representation with the logarithm taken of the calculation result, wherein y is less than or equal to 2 times x; and a rescaler for adding or subtracting a correction value to or from respectively the scaled logarithmic representation, the value corresponding to the logarithm function applied to the effective scaling factor, in order to receive a representation with the logarithm taken of the calculation result as the signal energy; a TNS module for calculating an energy-weighted spectrum for performing a calculation of a function inverse to the logarithm function, applied to (−SE>>1), for each spectral group signal energy, wherein SE designate the respective spectral group signal energy and ">>1" designate a shift to the right by 1 bit.

According to another embodiment, an audio encoder may have: an apparatus for calculating spectral group signal energies of an information amplitude signal so that the spectral group signal energies have the same scaling level, with an apparatus for calculating a signal energy of an information amplitude signal, having: a transformer for decomposing an information amplitude signal into spectral values present in an x-bit representation with the logarithm not taken; a processor for performing a squaring at the x-bit representation with the logarithm not taken of each spectral value in order to receive a respective squared spectral value, and a summation at the squared spectral values in order to receive a sum of squares as a calculation result in a y-bit representation with the logarithm not taken, wherein the processor is adapted such that the representation with the logarithm not taken of the calculation result is scaled with the effective scaling factor compared to the sum of squares; a logarithm taker for applying a logarithm function to y bits of the representation with the logarithm not taken of the calculation result in order to receive a scaled representation with the logarithm taken of the calculation result, wherein y is less than or equal to 2 times x; and a rescaler for adding or subtracting a correction value to or from respectively the scaled logarithmic representation, the value corresponding to the logarithm function applied to the effective scaling factor, in order to receive a representation with the logarithm taken of the calculation result as the signal energy; a module for performing a calculation of SE1−((SE2+SE3)>>1), wherein SE1, SE2 and SE3 are spectral group signal energies and ">>1" designate a shift to the right by 1 bit.

According to another embodiment, an audio encoder may have: an apparatus for calculating spectral group signal energies of an information amplitude signal so that the spectral group signal energies have the same scaling level, with an apparatus for calculating a signal energy of an information amplitude signal, having: a transformer for decomposing an information amplitude signal into spectral values present in an x-bit representation with the logarithm not taken; a processor for performing a squaring at the x-bit representation with the logarithm not taken of each spectral value in order to receive a respective squared spectral value, and a summation at the squared spectral values in order to receive a sum of squares as a calculation result in a y-bit representation with the logarithm not taken, wherein the processor is adapted such that the representation with the logarithm not taken of the calculation result is scaled with the effective scaling factor compared to the sum of squares; a logarithm taker for applying a logarithm function to y bits of the representation with the logarithm not taken of the calculation result in order to receive a scaled representation with the logarithm taken of the calculation result, wherein y is less than or equal to 2 times x; and a rescaler for adding or subtracting a correction value to or from respectively the scaled logarithmic representation, the value corresponding to the logarithm function applied to the effective scaling factor, in order to receive a representation with the logarithm taken of the calculation result as the signal energy, the logarithm function being $\log_2(\ )/64$; and a scale factor estimator for performing a calculation of log(k)+log 2*64*(LT−SE) for the spectral group signal energies, wherein SE designate the respective spectral group signal energy, "log( )" stand for a common logarithm, and LT be the listening threshold in a format with the logarithm taken with the logarithm function.

According to another embodiment, a method for calculating a signal energy of an information amplitude signal may have the steps of: decomposing an information amplitude signal into spectral values present in an x-bit representation with the logarithm not taken; performing a squaring at the x-bit representation with the logarithm not taken of each spectral value in order to receive one respective squared spectral value, and a summation at the squared spectral values in order to receive a sum of squares as a calculation result in a representation with the logarithm not taken, wherein the performing is executed such that the representation with the logarithm not taken of the calculation result is scaled with the effective scaling factor compared to the sum of squares; applying a logarithm function to y bits of the representation with the logarithm not taken of the calculation result in order to receive a scaled representation with the logarithm taken of the calculation result, wherein y is less than or equal to 2 times x; and adding or subtracting a correction value to or from the scaled logarithmic representation, the value corresponding to the logarithm function applied to the effective scaling factor in order to receive a representation with the logarithm taken of the calculation result as the signal energy.

According to another embodiment, a computer program with a program code for performing, when the computer program runs on a computer, may have the method for calculating a signal energy of an information amplitude signal, the method having the steps of: decomposing an information amplitude signal into spectral values present in an x-bit representation with the logarithm not taken; performing a squaring at the x-bit representation with the logarithm not taken of each spectral value in order to receive one respective squared spectral value, and a summation at the squared spectral values in order to receive a sum of squares as a calculation result in a representation with the logarithm not taken, wherein the performing is executed such that the representation with the logarithm not taken of the calculation result is scaled with the effective scaling factor compared to the sum of squares; applying a logarithm function to y bits of the representation with the logarithm not taken of the calculation result in order to receive a scaled representation with the logarithm taken of the calculation result, wherein y is less than or equal to 2 times x; and adding or subtracting a correction value to or from the scaled logarithmic representation, the value corresponding to the logarithm function applied to the effective scaling factor in order to receive a representation with the logarithm taken of the calculation result as the signal energy.

The inventive apparatus for creating a representation of a calculation result linearly dependent upon a square of a value, the calculation result being present in an x-bit representation with no logarithm taken, includes processing means for performing a processing of the x-bit representation with no logarithm taken of the value, in order to obtain the calculation result linearly dependent upon the value, wherein the processing means is configured to use an effective scaling factor, such that the calculation result is scaled in dependence on the effective scaling factor, means for taking the logarithm for applying a logarithm function to a y-bit representation of the calculation result, of which no logarithm is taken and which is obtained either indirectly or directly from the processing by the processing means—that is for example by picking out bit positions, in order to obtain a scaled representation with the logarithm taken of the calculation result and/or a representation with the logarithm taken of the scaled calculation result, wherein y is less than 2 times x; and a rescaler for adding or subtracting a correction value to or from respectively the scaled logarithmic representation, which corresponds to the logarithm function, such as a scaled logarithm, applied to the effective scaling factor, in order to obtain a representation with the logarithm taken of the—now no longer scaled—calculation result.

It is the finding of the present invention that in the transition into the logarithmic range, it is not necessary to take into consideration the entire bit width of the result linearly dependent upon the square of a value. Rather, it is possible to scale the result of a value with x bits such that a representation with less than x bits of the result is sufficient to obtain based thereon the logarithmic representation. The effect of the scaling factor on the resulting logarithmic representation may be cancelled by adding or subtracting a correction value, obtained by the logarithm function applied to the scaling factor, to or from respectively the scaled logarithmic representation without any loss of dynamics.

It is therefore one advantage of the present invention that in the inventive manner, a plurality of results may be transferred into a logarithmic representation in a way such that, subsequently, the scaling level will be the same for all, with the dynamics substantially maintained.

According to an embodiment of the present invention, the processing of the x-bit representation of the value consists in the creation of a sum of squares of a group of values in order to obtain the calculation result linearly dependent upon the value. Instead of performing the effective scaling factor only after the calculation of the sum of squares, however, the x-bit representations are scaled previously with a common scaling factor. The common scaling factor is determined from the number of values and/or by means of the largest number of valid positions among the x-bit representations of the values. This procedure makes it possible to constantly remain, starting from the initial situation with x-bit representations of the values, in the x-bit representation format. This equally applies to the squares of the individual values and to the sum of the individual squares. Here, the common scaling factor is determined such that the sum of squares is not subjected to overflow as a result of the summation. According to this embodiment, the logarithm function is performed on a section of the x-bit representation with no logarithm taken of the sum of squares. In this embodiment, too, the advantage is maintained that the procedure may be used for several groups of values so that on the one hand the values of the individual groups are scaled with a different common scaling factor, and on the other hand the subsequent scaling level is the same for the logarithmic representation of all sums of squares.

According to another embodiment of the present invention, a logarithm dualis is used as the logarithm function, together with a factor that is less than or equals 1/y. In this way, it is possible to carry out the mapping between the y-bit representation of the calculation result and the scaled representation with the logarithm taken of the calculation result in a manner that optimally utilizes the value ranges of both representations.

According to another embodiment of the present invention, for audio encoding, the spectral line values of a group are subjected to a creation of sums of squares in the above-mentioned manner group by group, that is by scaling the spectral line values prior to the calculation of the sums of squares, wherein the frequency line values are present in an x-bit fixed-point data format with no logarithm taken, by summing up the resulting single squares, which, too, must be present in the x-bit fixed-point data format only, by applying the logarithm function comprising the taking of the logarithm with the logarithm dualis and the scaling with the factor less than or equal to 1/x to the sum of squares, and by adding or subtracting a correction value obtained from the common scaling factor by the logarithm function to or from, respectively, the x-bit fixed-point representation of the result of taking the logarithm. In this way, the signal energies of all spectral groups are maintained on the same scaling level without reducing the dynamics. In addition, each of the calculating operations may be performed by means of a calculating unit configured for processing fixed-point numbers with x bits only. This embodiment is therefore advantageous in that it is possible to implement an audio encoder in a 16- or 24-bit fixed-point DSP without the necessity of complex programming with the increased calculating-time expenditure involved.

BRIEF DESCRIPTION OF THE DRAWINGS

Embodiments of the present invention will be detailed subsequently referring to the appended drawings, in which.

DETAILED DESCRIPTION

In the following, the present invention is described referring to the figures and frequently against the backdrop of the audio signal processing and specifically audio signal encoding. As will be explained in greater detail following the description of the figures, the present invention is not limited to this application field, but this setting predominantly serves to facilitate understanding.

Figure 1:
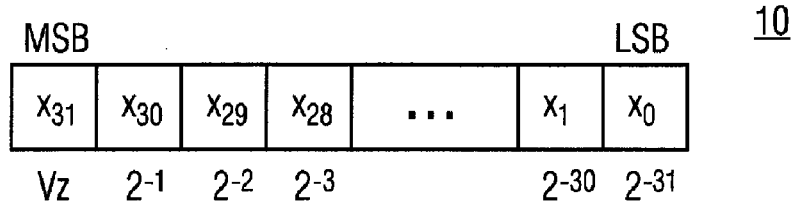
FIG. 1 is a schematic representation for illustrating the structure of a 32-bit fixed-point data format.

Before embodiments of the present invention are explained in greater detail, in the following an introduction to these embodiments, which is some kind of overview and makes the advantages of the following embodiments better understood, is supplied referring to FIGS. 1-3.

FIG. 2 shows the structure of a possible 32-bit fixed-point data format, which is the exemplary basis of the following embodiments discussed. The represented 32-bit data format may easily be applied to other bit counts as well. As can be seen, a value stored in the 32-bit fixed-point data format comprises 32 bits. A 32-bit register therefore suffices for storing this value in the 32-bit fixed-point data format. Such a register is designated in FIG. 1 with 10. The 32 bit positions are hinted at with individual squares numbered $X_0 \ldots X_{31}$ from the least significant bit (LSB) to the most significant bit (MSB). The meanings of the individual bit positions according to the 32-bit fixed-point data format are hinted at below the individual bit positions. As can be seen, the most significant bit represents the sign of the value, i.e. + or −. The remaining bits $X_{30}$-$X_0$ express the magnitude of the value. According to the embodiment of FIG. 1, these bits represent a true fraction, i.e. the data format 10 is a fractional fixed-point data format, in which, by convention, the point or the comma is positioned in the leftmost location, i.e. on the left-hand side before bit $X_{30}$. The value in the register 10 can therefore be expressed as $$X = (-1)^{X_{31}} \sum_{i=0}^{30} X_i \cdot 2^{i-31}.$$

As can easily be seen, the representable value range of the fractional fixed-point data format extends from approximately exclusively −1 to exclusively 1.

As has been discussed in the description introduction of the present invention, signal energies for example are obtained by means of squaring the frequency lines and summing up all squared frequency lines, i.e. the line energies, in a frequency group. The number of the lines contained in a frequency group ranges from 4 to 96 in the example of MPEG Layer-3 and MPEG AAC.

As has also been discussed in the description introduction of the present application, it is possible to represent the frequency line values in a fixed-point data format by using a global scaling factor that applies to all frequency lines of an audio channel and even to all frequency lines of all audio channels processed in an encoder, and that determines by how many positions each frequency line value is to be shifted left or right on the side of the decoder, so that the original scaling may be reobtained. In order to subject such 32-bit fixed-point data values on a fixed-point processor with a 32-bit data word width to a summation of squares for the calculation of the audio signal energies, the following basic requirements must be met for an efficient implementation of the calculation of the audio signal energies from the frequency lines:

The frequency lines must be represented with a word width of 32 bits. 16 bits are not sufficient.

The audio signal energies must also be represented in a fixed-point data format and not in a floating-point data format.

The audio signal energies must be represented in a data type with a word width no larger than 32 bits. This results in a word width of 32 bits for the audio signal energies as well.

The special embodiments of the present invention described in the following meet all these basic requirements, although it must be noted that a less efficient implementation may be obtained if not all of these basic requirements are met. As will be discussed later on, it is for example not absolutely necessary that the audio signal energies be limited in their word width to 32 bits. The reprocessing of the audio signal energies only is to be limited to a 32-bit fixed-point representation.

From the above requirements, the following problem in the calculation of the audio signal energies arises. The squaring of the 32-bit frequency line values first yields line energies with a word width of 64 bits, wherein, however, the 32 bits— in the case of the following embodiments, the lower 32 bits— are discarded in the further processing, and the fractional arithmetics continues with the upper 32 bits only.

Figure 2A:
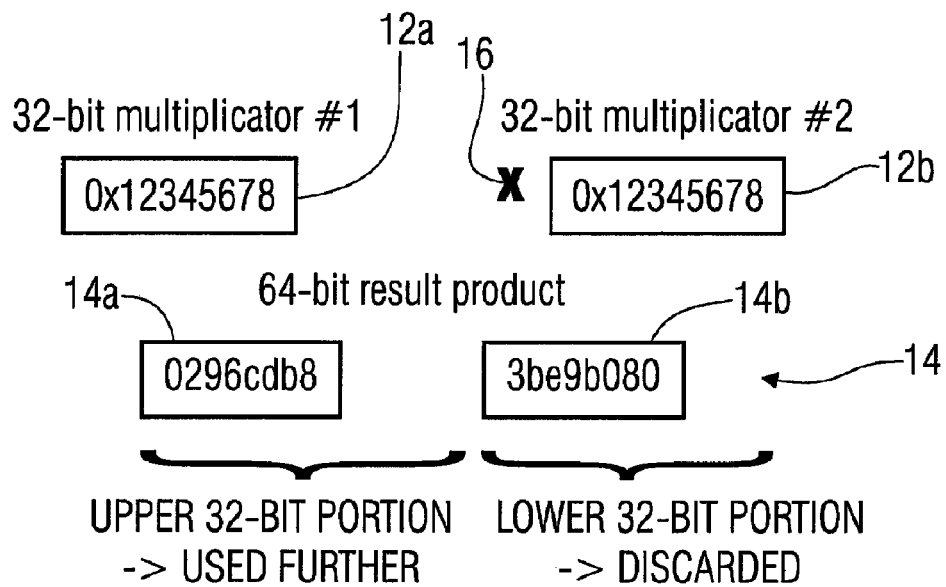
FIGS. 2a and 2b are schematic representations of a squaring of a 32-bit fixed-point data value for illustrating the effect of values too small on the 64-bit fixed-point result.
Figure 2B:
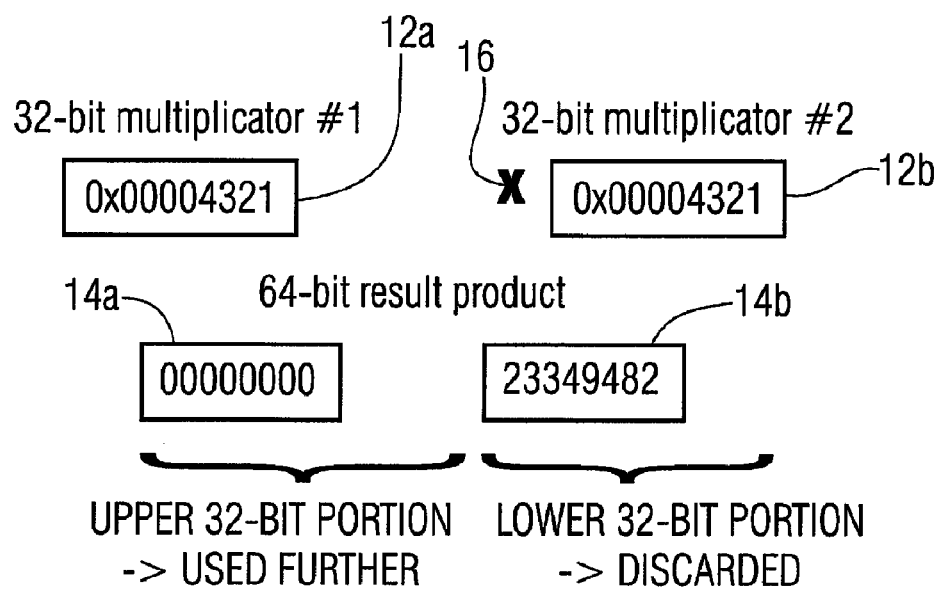

In order to illustrate this, reference is made to FIGS. 2a and 2b. These show two input registers 12a and 12b of a multiplier used as a squarer, by writing the same values into the input multiplicand registers 12a and 12b. Both registers 12a and 12b are 32-bit registers. Further, FIGS. 2a and 2b show a 64-bit output register 14 consisting of an upper portion 14a and a lower portion 14b.

The multiplier, which is not represented in FIGS. 2a and 2b, is configured to read the register contents of the registers 12a and 12b in the 32-bit fixed-point data format and to multiply 16 the two values so that a 64-bit result is yielded, which is output into the output register 14 in a 64-bit fixed-point data format. Thus, the upper portion 14a of the output register 14 covers the first 31 binary positions after the comma, whereas the lower portion 14b covers the remaining binary positions.

FIGS. 2a and 2b show situations in which different frequency line values have been written into the input registers 12a and 12b, so that differing results are yielded in the output register 14.

FIG. 2a specifically shows a situation in which the frequency line value is high, i.e. 0x12345678. As long as the frequency line values are gated out on a high level, i.e. occupy a large number of valid bits in a 32-bit data word, the upper 32 bits of the actually 64-bit wide result in the output register 14 are sufficiently accurate in order to express the result and/or the square. The error that is made when only the upper portion 14a is used rather than the complete result amounts to only 0x000000003be9b080 in the case of FIG. 2a.

FIG. 2b shows the case of a small frequency line value in the input registers 12a and 12b respectively, i.e. 0x00004321. Such frequency line values also occur, as, as has already been noted, all frequency lines of at least one audio channel have a global scaling factor and therefore typically a large number of frequency lines occupy a small number of valid bits in a 32-bit data word only, i.e. have a small amplitude. As can be seen from FIG. 2b, in the case of small frequency line values, the upper 32 bits of the output register 14 do not express the squaring result with sufficient accuracy. The summation of several such line energies to form a signal energy value, in particular, will therefore supply an incorrect result, i.e. for example zero, which in the later course of the audio encoding will result in a reduced audio quality. In the example of FIG. 2b, the upper portion of the output register will for example indicate a result of zero, while the actual result value would be 0x0000000023349482.

In view of the examples of FIGS. 2a and 2b, it appears to be necessary to first consider all 64 bits of the output register 14 in subsequent processings of the signal energies. This would, however, necessitate numerous complicated 64-bit data operations, i.e. operations with 64-bit operands, and infringe upon the above-mentioned basic requirements for an efficient implementation.

If, however, the upper 32-bit portion of each signal energy value in the output register 14 is actually to be used only, an improvement may first be achieved by shifting all frequency line values in a frequency group to the left by the same number of bits prior to the squaring, by which the results thus contains a larger number of valid bits in the upper 32-bit portion of the 64-bit result, or by shifting the result in the result register 14.

The upper portion 14a of each signal energy value could then be converted into a logarithmic range by applying a calculating unit for the calculation of a logarithm function to the respective upper portion 14a of the signal energies. The calculating unit would only have to be capable of taking the logarithm of a 32-bit fixed-point data value in order to obtain a 32-bit fixed-point data value. The logarithm function which converts the value x into the value y, could be $y=\log_2(x)/64$, the function course of which is illustrated in FIG. 3. FIG. 3 only shows the section of the logarithm function with $x\in]0,1[$, which is the only relevant one for the squared signal energy values in the 32-bit fixed-point data format. Here, the scaling factor $1/64$ ensures that the smallest possible value, i.e. an energy signal value of $2^{-63}$ (1 bit is at least reserved for the sign) also covers the possible output value range, which extends from −1 to 1 exclusively in the case of fixed-point representations, even if the energy signal values, which according to the logarithm function of FIG. 3 are taken the logarithm of, are 64-bit fixed-point values.

This procedure would, however, not be very satisfactory as in the further processing steps of the audio encoding within an audio encoder all signal energies must by all means have the same scaling and therefore the shift to the left and/or the scaling factor increasing the accuracy would interfere with exactly this same scaling level.

At this point exactly, the effect of a positive property of the taking of the logarithm is shown. As noted above, the representation of the line energies is maximally accurate by means of the prescribed shift to the left by for example bit positions in the frequency line and/or amplitude domain, and/or by the scaling by an effective $2^{2s}$ in the signal energy domain subject to said safety distance. Temporarily, the number of shifts to the left performed in this frequency group, i.e. the value s, must be noted. If the signal energy value of the logarithm function shown in FIG. 3, in the following referred to as LD64( ), which was calculated with such high accuracy, is now converted into the logarithmic range—in the following sometimes referred to as LD64 format—then same is still present with the maximum possible accuracy. A shift to the left of the frequency lines by 1 bit now corresponds to for example a shift to the left by 2 bits in the signal energies in the linear, non-logarithmic range, i.e. after the squaring, and this in turn corresponds to an addition of $2/64$ in the logarithmic range, as $2/64=\log_2(2^2)64=LD64(2^2)$.

In order to restore the original scaling in the signal energies in the LD64 format, only a subtraction with $2*s/64$ must be effected, wherein s corresponds to the previously noted shift to the left of the group's frequency line values. This subtraction, however, does not result in a loss of accuracy, as no valid bits are lost and/or shifted out, as would be the case with a shift to the right in the linear range. Thus, the signal energies are present in the LD64 format, which, as will be explained in the following, is advantageous for the further calculations in the audio encoder anyway, with a high accuracy and the same scaling for all signal energy values.

After the above discussion of the principles and advantages of the embodiments of the present invention, in the following, the embodiments of the present invention will be explained in greater detail with respect to FIGS. 4-7.

Figure 4:
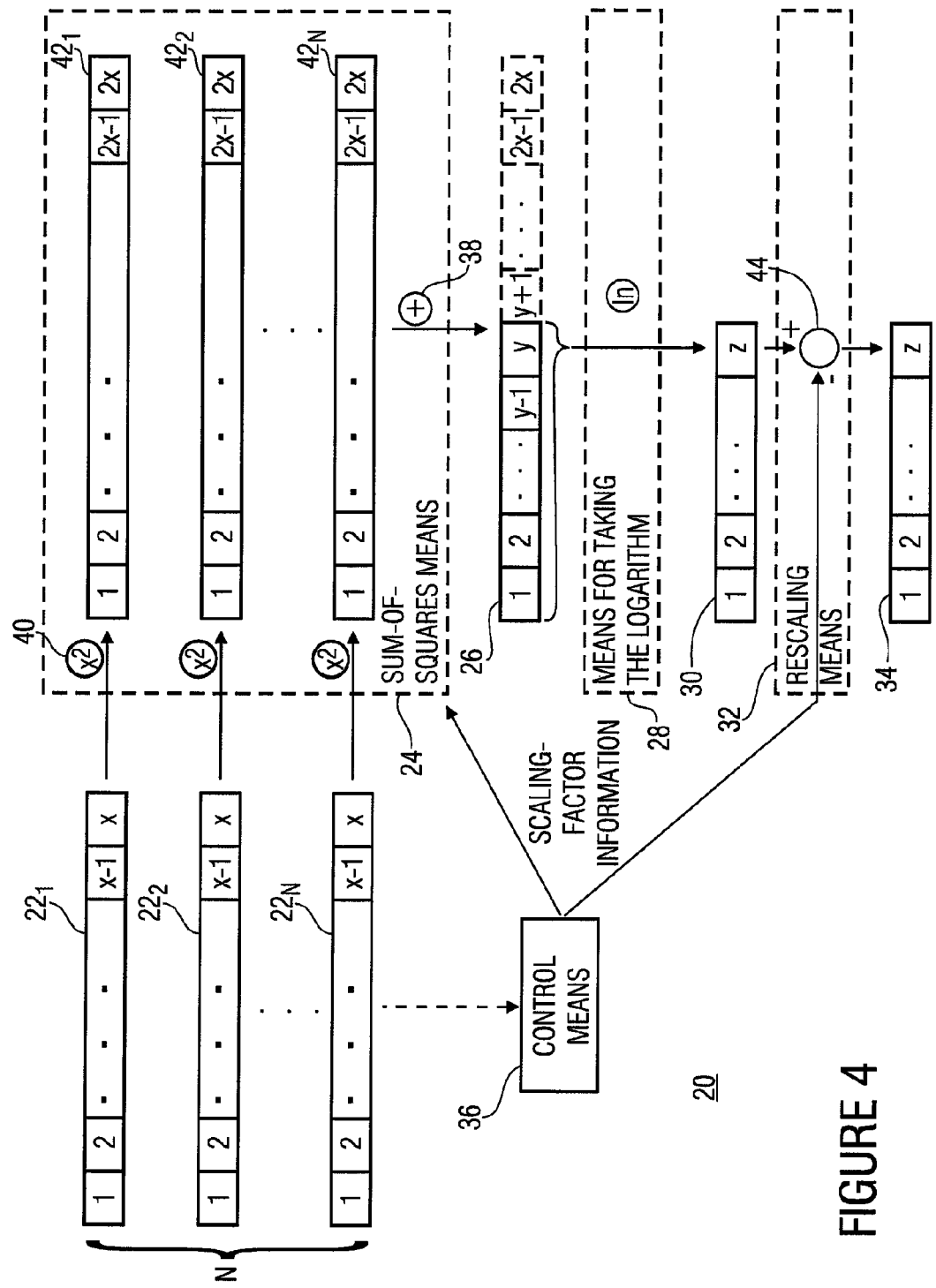
FIG. 4 is a schematic block diagram of an apparatus for creating a sum of squares according to an embodiment of the present invention.

FIG. 4 first shows a schematic representation of an apparatus suitable for calculating the sum of squares of a group of N x-bit fixed-point values, while on the one hand maintaining the dynamic range and on the other hand keeping the hardware expenditure within reasonable limits. The apparatus is based on the previous considerations.

The apparatus of FIG. 4, which is generally designated with 20, includes x-bit registers $22_1, 22_2 \ldots 22_N$ for storing the N-bit fixed-point values, a sum-of-squares means 24 for determining the sum of squares of values in the registers $22_1$-$22_N$ in the non-logarithmic range, scaled by an adjustable effective scaling factor, a first result register 26 for latching the result of the sum-of-squares means 24, means for taking the logarithm 28 for converting the result in the result register 26 into the LD64 format, a second result register 30 for latching the result of the means for taking the logarithm 28, rescaling means 32 for rescaling and/or reversing the rescaling of the result in the result register 30, an output register 34 for latching the final result as it is output by rescaling means 32, and control means 36 ensuring that the scaling effected by the sum-of-squares means 24 is reversed by the rescaling in rescaling means 32, and further determining the common scaling factor.

After the individual components of the apparatus 20 have been described, their cooperation in the creation of sums of squares will be described in the following, wherein each interaction is indicated by respective arrows.

As has already been mentioned, the values to be subjected to the sum of squares are first present in the registers $22_1$-$22_N$ in the x-bit fixed-point format. As has also previously been explained, these values, which may be frequency line values, may clearly diverge from one another with respect to the number of their valid bits.

The sum-of-squares means 24 now receives these values in the registers $22_1$-$22_N$ in order to subject same to a creation of a sum of squares in such a manner that finally a sum of squares of the values in the registers $22_1$-$22_N$ will be present in a fixed-point representation in the register 26, scaled by an effective scaling factor adjustable at least indirectly by control means 36. Here, it is not absolutely necessary that the result register 26, into which sum-of-squares means 24 writes the sum-of-squares result, have 2x bits. Rather, it will be sufficient, as is hinted at by the partial dashed-line representation of the register 26, if the sum-of-squares means 24 supplies a y-bit fixed-point representation of the result, wherein advantageously y=x.

In the following, two possibilities in particular will be singled out to show how sum-of-squares means 24 may consider the scaling factor information from control means 36 in order to output the scaled result in the register 26, and how control means 36 may determine the scaling factor information and/or the effective scaling factor, by which the result in the result register 26 is scaled, such that no valid bits will get lost by overflow.

Based on the preceding description, the first possibility consists in control means 36 analyzing the contents of the registers $22_1$-$22_N$ in order to determine the effective scaling value in advance such that no overflow may occur by the subsequent summation of the squares of the values in the registers $22_1$-$22_N$. This would occur if no overflow bits were present in an addition calculating unit of sum-of-squares means 24 indicated in FIG. 4 with 38, or at the latest when the "overflown" square and/or energy value is written into a memory cell that does definitely not offer any overflow bits, as is the case for example with register 26. Therefore, control means 36 adjusts the scaling factor information such in dependence of the number N and the maximum number of free bits in the registers $22_1$-$22_N$ and/or the maximum of x minus the number of the valid positions of the individual values in the registers $22_1$-$22_N$ that no overflow will occur in an output into the register 26 and/or the result will not leave the value range of −1 to 1 exclusively.

In particular, the control means 36 may, as has previously been mentioned, adjust the effective scaling factor, by which the result in the register 26 is scaled, via a common scaling factor, which the sum-of-squares means 24 utilizes to scale the register contents $22_1$-$22_N$ at the very beginning, i.e. prior to the squaring 40. In particular, the common scaling factor, as has previously been explained, may correspond to a power of 2, so that the advance scaling of the values in the registers $22_1$-$22_N$ may be achieved by a shift operation to the left. In this case, it would not be necessary, as has been explained above, that the sum-of-squares means 24 add 38 the intermediate results of the squarings 40 of the individual scaled register contents in a 2x fixed-point data format, in order to output the result in the result register 26; rather, sum-of-squares means 24 would necessitate a y-bit fixed-point representation of the intermediate squaring results $42_1 \ldots 42_N$ only. The summation 38 across all intermediate squaring results $42_1$-$42_N$ yields the final result of sum-of-squares means 24 in the register 26.

Another further possibility for determining and considering the scaling factor would be sum-of-squares means 24 first subjecting the register contents $22_1$-$22_N$ to the squaring 40 one after the other, in order to obtain intermediate results $42_1$-$42_N$ in the 2x fixed-point data format. Same would then be subjected to the summation 38 by sum-of-squares means 24. The resulting 2x fixed-point sum-of-squares result would then be examined for the number of unused bits and/or the difference between 2x and the number of valid positions by control means 36 in order to have performed a corresponding shift operation to the left by a respective number of bits at this 2x-bit sum-of-squares result by sum-of-squares means 24, before the latter enters the result into the result register 26. The disadvantage in this procedure compared to the one described first is that the internal calculation expenditure in sum-of-squares means 24 would be increased, as values $42_1$-$42_N$ would have to be processed with a word width of 2x, and in particular would have to be subjected to the summation 38. For this, either an addition calculating unit with increased performance capability is necessitated, or else a y-bit fixed-point data format addition calculating unit having an allocated overflow bit must be controlled more often. With this possibility, sum-of-squares means 24 would first square the values in the registers $22_1$-$22_N$ individually and then sum up 38 the 2x-bit fixed-point square values $42_1$-$42_N$ and after that scale the result according to the scaling factor information of the control unit 36 and output same to register 26.

In an embodiment, which is advantageously implemented with x=24 bits, the register 26 has a length of y=2x positions. In another embodiment, which is advantageously implemented with x=32 bits, a position reduction to x positions is performed as soon as in the squaring in a means $42_1$-$42_N$, in a way as soon as during the squaring or after the squaring, but prior to storing into the register. Then, the summation is effected with a word width of x bits. Here, the register 26 thus only comprises y=x positions. The means for taking the logarithm may then advantageously also comprise x positions.

By means of the effective scaling factor, the number of valid bits in the result register 26 may be adjusted almost optimally. Now, the means for taking the logarithm 28 receives the y-bit fixed point representation from the register 26 wherein, if necessary, the remaining bit positions of a higher accuracy are discounted, and subjects same to the LD64 format conversion discussed above with respect to FIG. 3, in order to enter the result into the register 30 in the z-bit fixed-point data format, wherein advantageously z=y, and advantageously y=x.

The result in the result register 30 represents a scaled logarithmic representation of the sum of squares of the values in the registers $22_1$-$22_N$. The rescaling means 32 now reverses the scaling by subtracting from the scaled value in the register 30 a correction value 44, which it receives from control means 36. In the case of the LD64 format, the correction value, as previously mentioned, amounts to LD64(s), wherein s be the effective scaling factor with which the sum of squares in the result register 26 is scaled.

Figure 5:
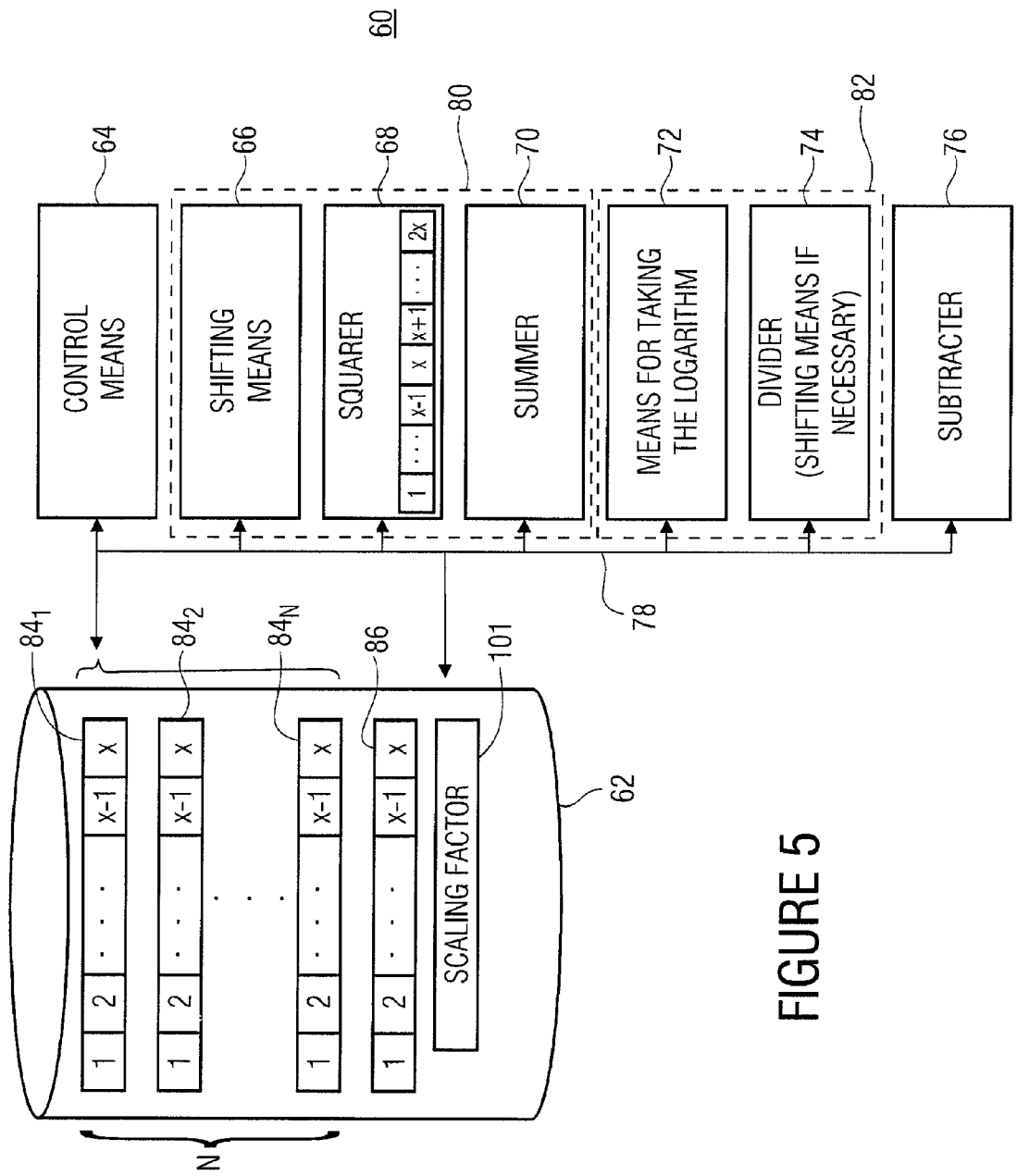
FIG. 5 is a block diagram of a possible implementation of the apparatus of FIG. 4.
Figure 6:
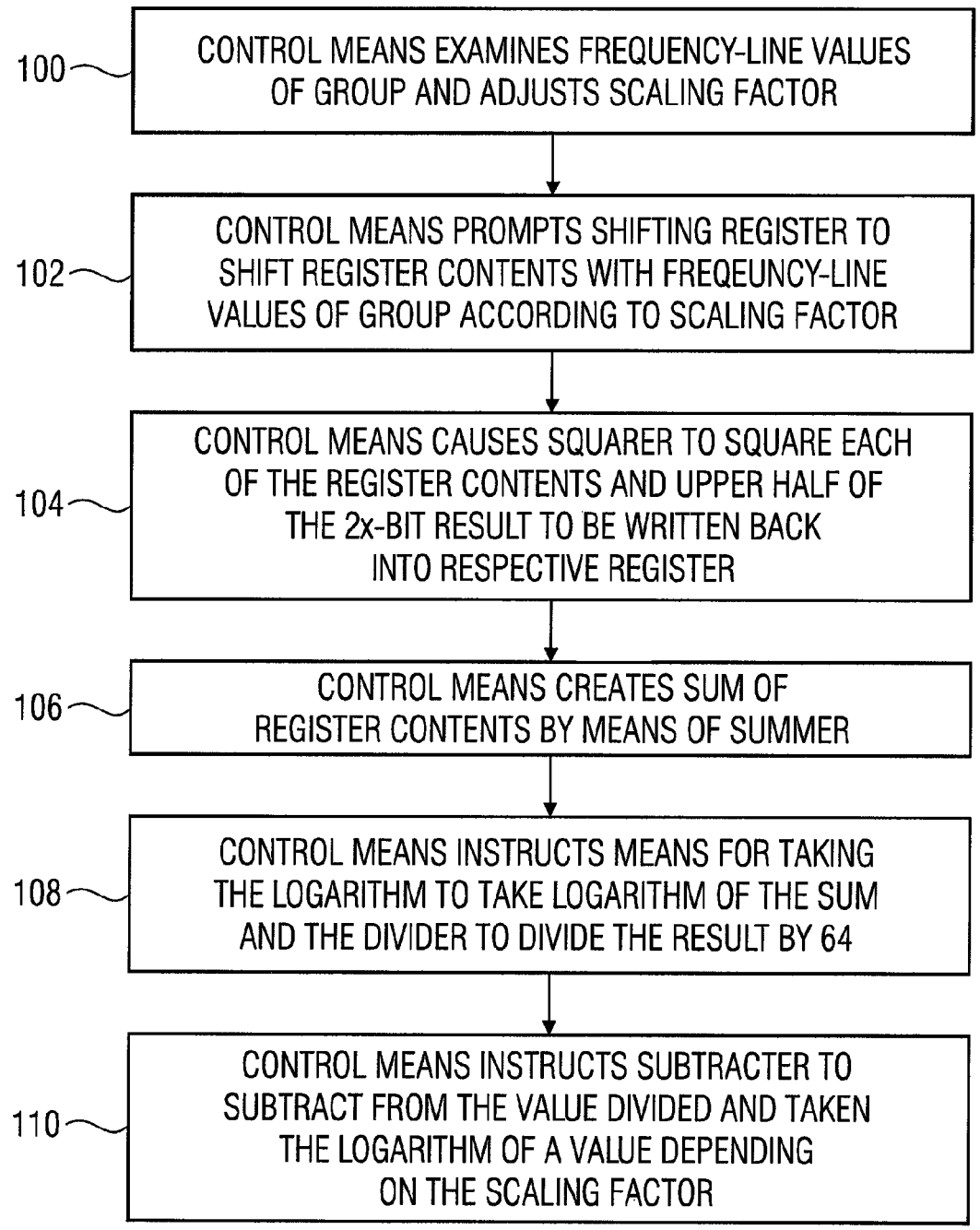
FIG. 6 is a flow chart for illustrating the function of the apparatus according to FIG. 5.

The result is then output in the register 34 in the fixed-point data format by resealing means 32. Referring to FIG. 4, a rough outline was given of the function of an embodiment of the present invention without going further into a possible hardware implementation. FIG. 5 shows a possible implementation of the apparatus of FIG. 4 in slightly more detail. The apparatus of FIG. 5, which is generally designated with 60, includes a memory 62, control means 64, shifting means 66, a squarer 68, a summer 70, a logarithm taker 72, a divider 74 and a subtractor 76. All modules 62-76 are connected in communication with one another via, for example, a bus or else a program interface 78. Means 66-76 may be implemented in hardware but may also in part be respective program codes performed by control means 64 in order to accomplish the respective tasks. The modules 66-76 must each only be capable of processing x-bit fixed-point data format operands. Among the modules 66-76, the modules 66-70 form sum-of-squares means 80, while the logarithm taker 72 and the divider 74 combine to form means for taking the logarithm 82.

Control means 64 is for example program-controlled and causes the sum-of-squares creation of values, which are deposited in the x-bit fixed-point data format in the memory 62 in the x-bit memory locations $84_1 \ldots 84_N$, to be performed. The exact function of control means 64 is discussed with respect to FIG. 6. Here, it is specifically assumed that the x-bit fixed-point values in the memory locations $84_1$-$84_N$ are frequency line values of a frequency group.

First, control means 100 examines the frequency line values of the group in the memory locations $84_1$-$84_N$ and adjusts a common scaling factor. The adjustment in step 100 is effected, as has been explained above, on the basis of the number N and the minimum number of unused bit positions in the memory locations $84_1$-$84_N$. Specifically, same adjusts the common scaling factor to a power of 2, such as $2^s$. Alternatively, control means 64 adjusts a shift value s, which corresponds to the common scaling factor $2^s$. The control means enters the value s or $2^s$ in an internal or external register 101 for latching.

In a subsequent step 102, control means 64 causes shifting means 66 to shift the contents of the memory locations $84_1$-$84_N$ with the frequency line values of the group to the left by s bit positions according to the common scaling factor and/or the shift value.

In a step 104, control means 64 then causes the squarer 68 to square each value in the memory locations $84_1$-$84_N$ and to write the upper half of the 2x-bit result back into the respective memory location $84_1$-$84_N$. The squarer 68 is for example a multiplier, wherein control means 104 writes the respective value to be squared from one of the memory locations $84_1$-$84_N$ into both x-but multiplicand registers of the multiplier. The squarer may internally include for example a 2x-bit result register, wherein control means 64, however, makes sure that only the upper half, i.e. an x-bit fixed-point squaring value, is written back into the respective memory location $84_1$-$84_N$.

Alternatively, the squarer calculates only one x-bit representation in advance and therefore has only one x-bit output register.

After that, in a step 106, control means 64 creates a sum across all contents of the memory positions 84₁-84ₙ by means of the summer 70. It may begin with the sum of the first two values and writes the result into an x-bit sum register 86 in the x-bit fixed-point data format. Afterwards, control means 64 might use the summer 70 in order to add the value with the memory position 86 to the subsequent values one after the other and overwrite each previous value in the memory location 86 with the resulting sum. Alternatively, control means 64 may make sure that the sum is written into one of the memory positions 84₁-84ₙ and accumulated there.

In a step 108, control means 64 then instructs the logarithm taker 72 to take the logarithm of the sum in the memory location 86, and after that the divider 74 to divide the result by 64. The intermediate result of the logarithm taker 72 is for example written back into the memory location 86, as is for example the result of the divider 74. If the divisor is a power of 2, the divider will be implemented as a simple shifting means.

After the step 108, a scaled representation with the logarithm taken of the sum of squares is therefore present in the memory location 86. In a step 110, the control means therefore instructs the subtractor 76 to subtract from the value in the memory location 86, which is divided and the logarithm of which is taken, a value dependent on the scaling factor s stored in latch 101, i.e. the value 2*s/64.

After embodiments of the present invention have been described above with respect to FIGS. 4-6, in the following an embodiment for an audio encoder is discussed, in which an apparatus according to these embodiments is implemented.

Figure 7:
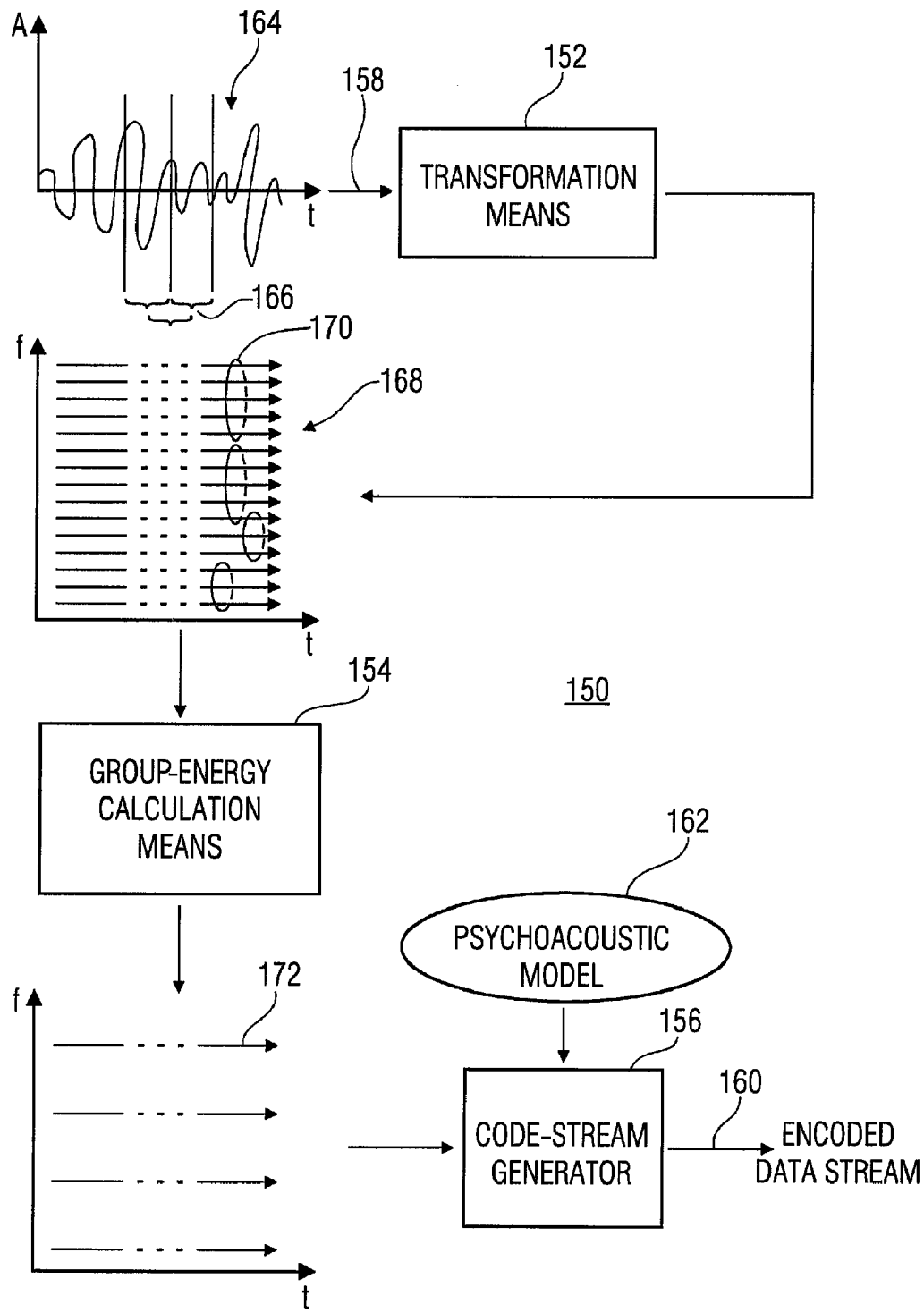
FIG. 7 is a schematic block diagram for illustrating an audio encoder according to an embodiment of the present invention.

The audio encoder of FIG. 7, which is generally designated with 150, includes transformation means 152, group energy calculation means 154 and a code stream generator 156, which are connected in series between an input 158 and an output 160 of the encoder 150. The code stream generator 156 uses a psychoacoustic model 162 in order to give off irrelevance information for example from an audio signal 164 to be encoded and present at the input 158, the distance of which only slightly or not at all affects the audio quality of the encoded data stream output at the output 160. Although not shown in FIG. 7, it could be that the code stream generator 156 is coupled to transformation means 152 or to group energy calculation means 154 via a feedback path.

The audio signal 164 present at the input 158 is present for example as a sequence of audio sampling values, which were sampled with a predetermined sampling frequency. The audio signal 164 may for example be present in a PCM format. At 164, the audio signal is represented as plotted against time t, wherein the vertical axis represents the amplitude A in arbitrary units.

Then, transformation means 152 transforms the audio signal 164 from a time range into a spectral range by decomposing the audio signal 164 into its spectral constituents. Transformation means 152 may for example specifically consist of an analysis filter bank having 32 band-pass filters. More precisely, transformation means 152 decomposes the audio signal 164 into spectral components section by section. The sections or frames 166, for which the spectral decomposition is effected, overlap in time by for example 50%. In each spectral component, a spectral value and/or frequency line value is created for each successive frame, which is illustrated by means of dots in the spectrogram 168 generated by transformation means 152. This way, a frequency line from a sequence of frequency line values is created per spectral component, wherein the frequency lines are indicated at 168 with horizontal arrows, which are visually split up in frequency line values for the three indicated frames 166 only. In the spectogram 168, an arbitrary number of frequency lines is arranged along the spectral axis or frequency axis f, whereas, however, the actual number of frequency lines will be larger.

Based on the spectogram 168 thus created, the code stream generator 156 will generate the encoded data stream. To this end, the code stream generator 156 does, however, not or not invariably necessitate the spectral decomposition of all spectral components. Rather, the frequency lines are split up according to psychoacoustic aspects into groups 170, as is indicated by circles.

For the code stream generation for each group 170, the code stream generator 156 now specifically necessitates, for each of the frames 166, the associated signal energy value, i.e. the sum of squares of the amplitude values, i.e. the sum of squares of the frequency line values.

This calculation is performed by group energy calculation means 154. It calculates the signal energy for each group 170 of frequency lines as the sum of squares of the frequency lines, wherein group energy calculation means 154 is for example configured as shown in FIGS. 4 and 5 and/or functions as described in FIGS. 4-6. The result of group energy calculation means 154 is sequences 172 of signal energy values, i.e. one sequence 172 per group 170. Therefore, the signal energy sequences 172 have one signal energy value per frame 166, which is illustrated along the arrows 172 by means of a dot.

Based on these sequences 172 of signal energy values, the code stream generator 156 then generates the encoded data stream 160 on the basis of the psychoacoustic model 162. Here, one advantage in the reprocessing of the signal energy values in means 156 is not only the values being present in a fixed-point data format having the same number of bits as frequency line values were present, but also the values being present in the logarithmic range, as this range enables simpler execution of multiplications, exponentiations and divisions, as these calculating operations transfer into simpler additions/subtractions and multiplications/divisions in the logarithmic range.

In order to illustrate this, consider the case of the encoder of FIG. 7 outputting an MPEG data stream.

The audio encoder of FIG. 7 is for example an MPEG AAC encoder. In this case, the code stream generator 156 includes a TNS (temporal noise shaping) module, in which the code stream generator 156 performs an efficient calculation of the energy-weighted spectrum. The TNS module in particular performs a calculation with the signal energies SE of the type $x=1/\sqrt{SE}$. This may be effected more easily with the signal energies being in the logarithmic format LD64, as it is used by group energy calculation means 154. The TNS module simply calculates X into $LD64^{-1}$ (-LD64_SE>>1), wherein a>>b indicate a shift operation to the right of the operand a on the left-hand side by the number b of bits on the right-hand side, whereas $LD64^{-1}()$ be an inverse function of the logarithm function LD64( ), and LD64_SE be the signal energy value in the logarithmic LD64 format, as it is output by group energy calculation means 154. ">>1" therefore designates a shift to the right by 1 bit, which corresponds to a division by 2. The division by 2, as it is effected in the logarithmic range, corresponds to a square root in the linear range. The minus sign corresponds to the inverse function 1/x in the linear range. The calculation of the $LD64^{-1}$ function may be realized with less complexity than calculating the root of and inverting the result, which would be necessitated if the signal energies were fed to the code stream generator 156 in the linear range.

The code stream generator 156 could also generate an encoded MPEG 4 AAC data stream and would then include a PNS (perceptual noise substitution) module. The PNS module internally calculates the distance between the listening threshold and the signal energy in a frequency group 170. The PNS module specifically determines, by means of the distance between listening threshold and signal energy, if a noise substitution may or should be performed. The larger dynamics and related accuracy of the logarithmic representation of the signal energies as they are output by group energy calculation unit 154, and the listening thresholds that are also provided in the logarithmic representation LD64 in the code stream generator 156, are the essential contribution to the correct PNS determination. In particular, in a coherence function in the PNS module, a division and a root calculation in the form of $Y=(SE1/\sqrt{SE2 \cdot SE3})$ occur, wherein SE1, SE2 and SE3 are signal energies output by group energy calculation means 154. The logarithmic representation of the signal energy facilitates and accelerates this calculation to a large extent. Specifically, the PNS module in the code stream generator 156 may perform the calculation of LD64_Y, i.e. of Y in the LD64 format, by calculating the following:

$$LD64\_Y = LD64\_SE1 - ((LD64\_SE2 + LD64\_SE3) \gg 1),$$

wherein LD64_SE# be the logarithmic representation of the respective signal energy value SE#, as it is output by group energy calculation means 154.

The code stream generator 156 may for example also comprise a center/side stereo module performing a center/side encoding decision. In this CS module, numerous divisions are calculated, i.e. from listening threshold to signal energy, for the decision whether a center/side (CS) encoding is to be used or not. By the use of the LD64 format, as it is output by group energy calculation means 154, these divisions transfer into simple subtractions. The thresholds, as of which an CS encoding is to be used, are constant and may therefore be converted into the logarithmic range already in the source code, whereby no further calculation time is necessitated in addition to the program runtime. This applies to many more constants used in the modified code in connection with the LD64 calculations. The above-mentioned in particular also applies to the intensity stereo module of an MPEG Layer-3 or AAC encoder.

The code stream generator 156 may further comprise a scale factor estimator that performs a calculation of a loudness. In the scale factor estimator, which is for example located in a quantizing module of the code stream generator 156, a calculation of the fourth root of the listening thresholds, i.e. a loudness calculation, is effected. By representing the listening threshold by means of a logarithmic data format, i.e. the LD64, the calculation of this fourth root may be performed very efficiently by simply shifting the logarithmic mean thresholds to the right by 2 bits. The reverse step, i.e. an involution by 4, may also be performed in a very simple way by a shift to the left by 2 bits.

In the scale factor estimator of the code stream generator 156, furthermore for example a calculation of the scale factors SCF, constituting a part of the quantization step width, may be calculated from the modified listening thresholds LT and the signal energies SE. The calculation includes a calculation step of the type SCF=log(k*LT/SE), wherein log( ) be a common logarithm and k be a constant. This calculation may be achieved very elegantly and efficiently by the use of the LD64 format and a corresponding conversion of the original formula. The scale factor estimator would perform the calculation specifically as such: SCF=log(k)+log 2*64* (LD64_LT−LD64_SE).

The above examples of possible modules within the code stream generator 156 show that the use of the logarithmic data format LD64 facilitates an increase in efficiency on fixed-point processors. The logarithmic data format LD64 in many cases all but makes the implementation of an audio codec with high audio quality on these platforms possible, if a certain audio quality is not to be fallen short of.

The above examples for possible modules in the code stream generator 156 in particular showed that the representation of the signal energies, listening thresholds and further energy values in a logarithmic data format is extremely appropriate, as in the processing of the signals energies and listening thresholds, most calculation steps are performed by means of a division or multiplication. A division therefore transfers into a subtraction and a multiplication into an addition, which results in an efficient representation and processing of the signal energies and listening thresholds in an audio encoder by means of the illustrated logarithmic data format. The signal energies in the linear range, i.e. in the non-logarithmic range, are represented in the fractional fixed-point data format, which has a value range of −1.0 to +0.99999 . . .

In the above embodiments, a logarithm to the basis of 2, the logarithm dualis LD, was used. In a logarithm dualis, a signal energy value of 0.25 in the linear range corresponds to an LD value of −2. A signal energy value of 0.3 in the linear range corresponds to an LD value of −1.7369656. As on a fixed-point processor, typically either integer values or else fractional values, but no mixed values, may be represented, in the preceding embodiments, the LD values were scaled such in the context of the LD64 format that only fractional values are obtained. Of course, another possibility would be to choose the scaling such that only integer values are obtained. A scaling with a factor 1/64 was specifically chosen, as this factor is applicable to all word widths up to 64 bits and therefore also covers the conventional word widths of 48 bits and 32 bits. The calculation of the logarithm dualis scaled with 1/64, i.e. the LD64 format, is performed according to the formula $y=\log_2(x)/64=LD64(x)$. In renouncement of the extended portability, this factor could of course also be increased, i.e. up to 1/y, wherein y be the number of bits of the scaled sum of squares with the logarithm not taken.

Figure 3:
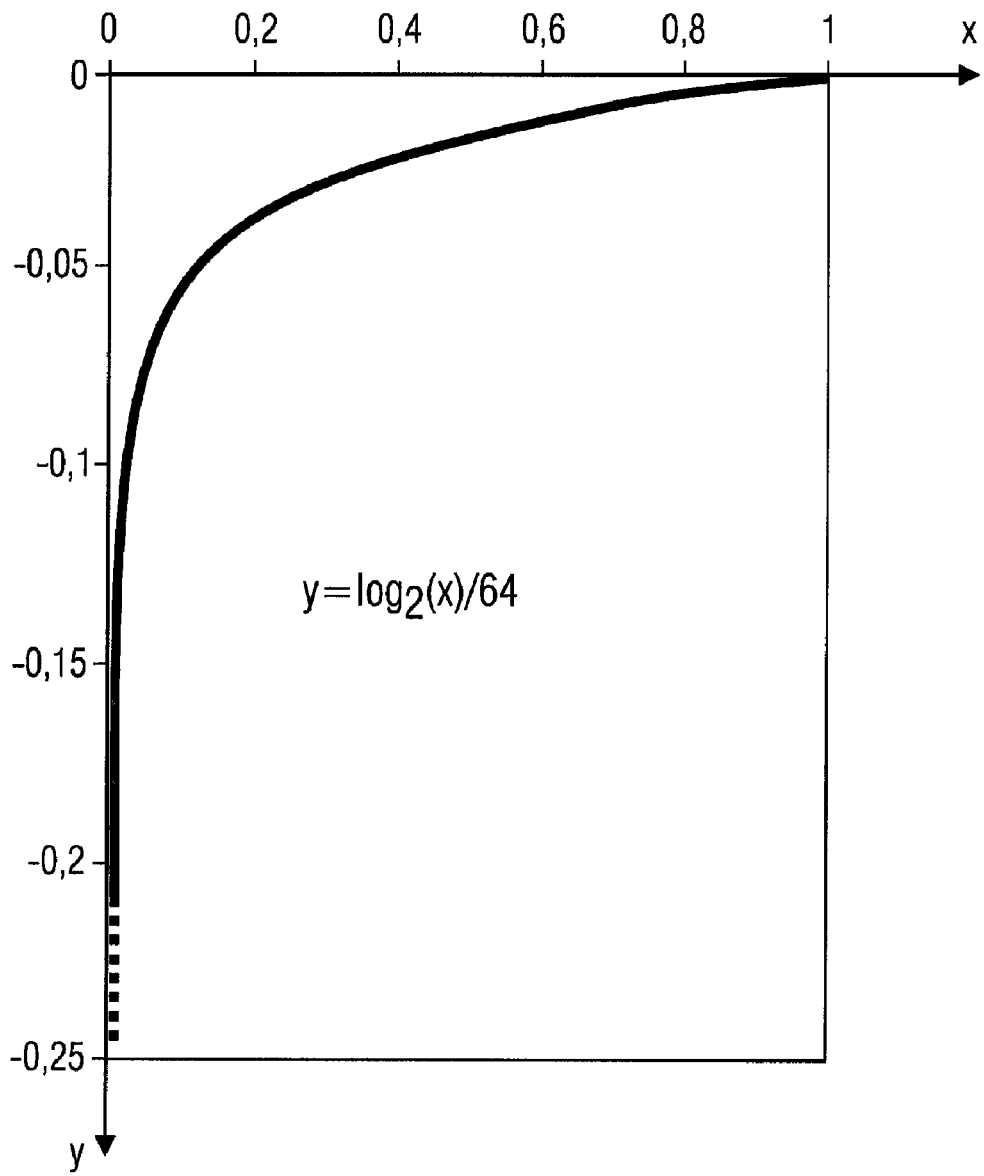
FIG. 3 is a graph of a logarithm function according to an embodiment of the present invention.

FIG. 3 shows the graph of the logarithm function. Here, the characteristics of the logarithm function can be recognized, which for smaller, i.e. in a fixed-point representation actually more inaccurate, input values x (closer to 0.0) offers a greater number of output values y, i.e. a smaller resolution, in the logarithmic range, which, as they are larger in magnitude, i.e. closer to −1.0, are therefore more accurate in a fixed-point representation. According to the above embodiments, a loss of accuracy in the calculation of signal energies prior to the transition into the logarithmic range was avoided by the common scaling factor and/or the common shift value prior to squaring.

The embodiment of FIG. 7 therefore represents an encoder using a scaled or even non-scaled logarithmic data format in the psychoacoustic model and/or in the quantization module for the representation and processing of the signal energies and listening thresholds. It is to be understood, however, that the above description of the logarithm dualis and of the scaling with 1/64 is only an example. In any case, the logarithmic representation serves to achieve faster execution of numerous calculations, such as in the center/side decision module and the scale factor estimator of the quantization module, because, as has been explained, by the use of the logarithmic format, the divisions originally present there transfer into simple subtractions, which can be performed many times faster on a fixed-point processor. The same applies to root calculations, such as the calculation of a square root, a fourth root etc., which transfer into simple shifts to the right. The calculation expenditure to be taken for the transfer into the logarithmic range is by far compensated for by the speed gain in the later steps of the algorithm. Therefore, the advantages of the above embodiments specifically are the higher accuracy of the values represented logarithmically as well as the higher processing speed in the use of the logarithmic representation.

Referring to the above description, it is to be understood that the present invention is not limited to fixed-point data formats. The above embodiments relating to the creation of sums of squares of values may also be reasonably applied to values that are present not in the fixed-point data format but in an integer data format. In this case, the higher-value y bits from the 2x-bit sum-of-squares result would be supplied to taking of the logarithm.

According to the above embodiments, a function for taking the logarithm was used in which a scaling by 1/64 was performed. This factor is reasonable if one and the same encoding is to run on different platforms with different fixed-point data formats. It is, however, also possible that the factor in the logarithm function may only be larger than x, i.e. larger than the number of the bits of the values that are supplied to the summing of squares.

Furthermore, it is to be understood with respect to the preceding embodiments, that the present invention is not limited to the creation of sums of squares. The present invention could for example also be advantageous if the groups existed of only one value so that only one encoding were performed. In this case, control means 36 would of course not have to anticipate the scaling factor information in any way. Rather, in this case, the scaling factor used for scaling the value prior to squaring, would automatically result from the number of valid bits and/or the number of unused bits. Very generally, the present invention may be used for the creation of a representation of a result linearly dependent upon a square of a value.

Referring to the above description, it is also to be understood that the present invention is of course not limited to a use in the context of audio encoding. The same advantages described above with respect to the audio encoding, i.e. achieving the same scaling level for the individual signal energies with the dynamic range maintained and simultaneous reduction of the audio encoding expenditure, may also be obtained in other application fields, for example in providing an audio file with a water mark or the like.

It is especially to be understood that, dependent on the circumstances, the inventive scheme may also be implemented in software. The implementation may be effected on a digital storage medium, in particular a floppy disk or a CD with electronically readable control signals cooperating with a programmable computer system such that the respective method is performed. In general, the invention therefore also consists in a computer program product with a program code for performing the inventive method stored on a machine-readable carrier, when the computer program product runs on a computer. In other words, the invention may therefore be realized as a computer program with a program code for performing the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for calculating a signal energy of an information amplitude signal, comprising
   a transformer for decomposing an information amplitude signal into spectral values present in an x-bit representation with a logarithm not taken;
   a processor for performing a squaring at the x-bit representation with the logarithm not taken of each spectral value in order to receive a respective squared spectral value, and a summation at the squared spectral values in order to receive a sum of squares as a calculation result in a y-bit representation with the logarithm not taken, wherein the processor is adapted such that the representation with the logarithm not taken of the calculation result is scaled with an effective scaling factor compared to the sum of squares;
   a logarithm taker for applying a logarithm function to y bits of the representation with the logarithm not taken of the calculation result in order to receive a scaled representation with the logarithm taken of the calculation result, wherein y is less than or equal to 2 times x; and
   a rescaler for adding or subtracting a correction value to or from respectively the scaled logarithmic representation, the value corresponding to the logarithm function applied to the effective scaling factor, in order to receive a representation with the logarithm taken of the calculation result as the signal energy.

2. The apparatus according to claim 1, wherein the processor is adapted to anticipate the x-bit representation of each spectral value of the group in a fixed-point data format.

3. The apparatus according to claim 1, further comprising:
   a controller for driving the processor such that the effective scaling factor is dependent upon a number of the spectral values of the group of values.

4. The apparatus according to claim 1, further comprising:
   a controller for driving the processor such that by the scaling with the effective scaling factor, the number of valid positions in the representation with the logarithm not taken of the calculation result is larger than it would be without the effective scaling factor.

5. The apparatus according to claim 1, further comprising a controller for adjusting a common scaling factor in dependence on a number of the spectral values, the processor comprising:
   a scaler for scaling the x-bit representation with the logarithm not taken of each spectral value in dependence on the common scaling factor in order to receive scaled spectral values in an x-bit representation;
   a squarer for squaring the x-bit representation of each scaled spectral value in order to receive scaled squared spectral values; and
   a summer for summing up the scaled squared spectral values in order to receive the sum of squares.

6. The apparatus according to claim 5, wherein the x-bit representation with the logarithm not taken of each spectral value is represented in a fixed-point data format, and the controller is adapted to further perform the adjustment in dependence on a smallest number of unused bit positions in the x-bit representations of the spectral values.

7. The apparatus according to claim 5, wherein the controller is adapted to adjust the common scaling factor to a $k^{th}$ power of 2, and the scaler is adapted to shift the x-bit representation of a spectral value of the group in an x-bit value register by k bits.

8. The apparatus according to claim 5, wherein the squarer comprises a 2x result register and is adapted to deposit a predetermined scaled squared spectral value of the scaled squared spectral values in a 2x-bit representation in the 2x result register, and the summer is adapted to read a y-bit section of the 2x-bit representation from the 2x result register while disregarding the remaining bits in the 2x result register in order to sum up the y-bit section together with the y-bit sections of the other scaled squared spectral values and write the sum of squares into a y-bit register.

9. The apparatus according to claim 1, wherein the logarithm taker is adapted to process the y-bit representation with the logarithm not taken such that the scaled representation with the logarithm taken corresponds to a y-bit representation of the logarithm dualis of the y-bit representation with the logarithm not taken divided by a number greater than or equal to y, and the rescaler is adapted to add to the scaled representation with the logarithm taken or subtract thereof an amount corresponding to the logarithm dualis of the effective scaling factor divided by the number.

10. The apparatus according to claim 9, wherein the number is 64 and y=x=32.

11. The apparatus according to claim 1, wherein the processor, the logarithm taker, and the rescaler are adapted to operate in a fixed-point data format.

12. The apparatus according to claim 1, implemented in a fixed-point processor.

13. The apparatus according to claim 1, wherein y equals x.

14. The apparatus according to claim 1, wherein
the transformer is adapted to decompose the information amplitude signal into spectral components in order to receive one spectral line per spectral component, wherein each spectral line includes a sequence of spectral values, wherein the spectral lines are allocated to different spectral groups, and wherein the processor is adapted to perform, for each of the groups, the squaring and the summation at spectral values within the respective group in order to receive, for the respective group, a sum of squares as a calculation result, and the logarithm taker and the rescaler are adapted to receive a signal energy for each sum of squares.

15. The apparatus according to claim 1, further comprising:
a code stream generator for, based on the signal energy values of the groups, generating an encoded data stream representing an encoded version of the information amplitude signal.

16. The apparatus according to claim 15, wherein the code stream generator is adapted to generate the encoded data stream further based on a psychoacoustic model.

17. The apparatus according to claim 15, wherein the code stream generator is an MPEG 1/2 Layer-3 encoder or an MPEG 2/4 AAC encoder.

18. The apparatus according to claim 1, wherein the information amplitude signal is an audio signal.

19. An audio encoder, comprising
an apparatus for calculating spectral group signal energies of an information amplitude signal so that the spectral group signal energies comprise the same scaling level, with an apparatus for calculating a signal energy of an information amplitude signal, comprising;
a transformer for decomposing an information amplitude signal into spectral values present in an x-bit representation with a logarithm not taken;
a processor for performing a squaring at the x-bit representation with the logarithm not taken of each spectral value in order to receive a respective squared spectral value, and a summation at the squared spectral values in order to receive a sum of squares as a calculation result in a y-bit representation with the logarithm not taken, wherein the processor is adapted such that the representation with the logarithm not taken of the calculation result is scaled with an effective scaling factor compared to the sum of squares;
a logarithm taker for applying a logarithm function to y bits of the representation with the logarithm not taken of the calculation result in order to receive a scaled representation with the logarithm taken of the calculation result, wherein y is less than or equal to 2 times x; and
a rescaler for adding or subtracting a correction value to or from respectively the scaled logarithmic representation, the value corresponding to the logarithm function applied to the effective scaling factor, in order to receive a representation with the logarithm taken of the calculation result as the signal energy;
a TNS module for calculating an energy-weighted spectrum for performing a calculation of a function inverse to the logarithm function, applied to (−SE>>1), for each spectral group signal energy, wherein SE designate the respective spectral group signal energy and ">>1" designate a shift to the right by 1 bit.

20. An audio encoder, comprising
an apparatus for calculating spectral group signal energies of an information amplitude signal so that the spectral group signal energies comprise the same scaling level, with an apparatus for calculating a signal energy of an information amplitude signal, comprising;
a transformer for decomposing an information amplitude signal into spectral values present in an x-bit representation with a logarithm not taken;
a processor for performing a squaring at the x-bit representation with the logarithm not taken of each spectral value in order to receive a respective squared spectral value, and a summation at the squared spectral values in order to receive a sum of squares as a calculation result in a y-bit representation with the logarithm not taken, wherein the processor is adapted such that the representation with the logarithm not taken of the calculation result is scaled with an effective scaling factor compared to the sum of squares;
a logarithm taker for applying a logarithm function to y bits of the representation with the logarithm not taken of the calculation result in order to receive a scaled representation with the logarithm taken of the calculation result, wherein y is less than or equal to 2 times x; and
a rescaler for adding or subtracting a correction value to or from respectively the scaled logarithmic representation, the value corresponding to the logarithm function applied to the effective scaling factor, in order to receive a representation with the logarithm taken of the calculation result as the signal energy;

a module for performing a calculation of SE1−((SE2+SE3)
>>1), wherein SE1, SE2 and SE3 are spectral group
signal energies and ">>1" designate a shift to the right
by 1 bit.

21. An audio encoder, comprising
an apparatus for calculating spectral group signal energies
of an information amplitude signal so that the spectral
group signal energies comprise the same scaling level,
with an apparatus for calculating a signal energy of an
information amplitude signal, comprising
  a transformer for decomposing an information amplitude signal into spectral values present in an x-bit representation with a logarithm not taken;
  a processor for performing a squaring at the x-bit representation with the logarithm not taken of each spectral value in order to receive a respective squared spectral value, and a summation at the squared spectral values in order to receive a sum of squares as a calculation result in a y-bit representation with the logarithm not taken, wherein the processor is adapted such that the representation with the logarithm not taken of the calculation result is scaled with an effective scaling factor compared to the sum of squares;
  a logarithm taker for applying a logarithm function to y bits of the representation with the logarithm not taken of the calculation result in order to receive a scaled representation with the logarithm taken of the calculation result, wherein y is less than or equal to 2 times x; and
  a rescaler for adding or subtracting a correction value to or from respectively the scaled logarithmic representation, the value corresponding to the logarithm function applied to the effective scaling factor, in order to receive a representation with the logarithm taken of the calculation result as the signal energy,
  the logarithm function being $\log_2(\ )/64$; and
  a scale factor estimator for performing a calculation of $\log(k)+\log 2*64*(LT-SE)$ for the spectral group signal energies, wherein SE designate the respective spectral group signal energy, "log( )" stand for a common logarithm, and LT be the listening threshold in a format with the logarithm taken with the logarithm function.

22. A method for calculating a signal energy of an information amplitude signal, and comprising:
  decomposing, performed by a transformer, an information amplitude signal into spectral values present in an x-bit representation with a logarithm not taken;
  performing, performed by a processor, a squaring at the x-bit representation with the logarithm not taken of each spectral value in order to receive one respective squared spectral value, and a summation at the squared spectral values in order to receive a sum of squares as a calculation result in a representation with the logarithm not taken, wherein the performing is executed such that the representation with the logarithm not taken of the calculation result is scaled with an effective scaling factor compared to the sum of squares;
  applying, performed by a logarithm taker, a logarithm function to y bits of the representation with the logarithm not taken of the calculation result in order to receive a scaled representation with the logarithm taken of the calculation result, wherein y is less than or equal to 2 times x; and
  adding or subtracting, performed by a rescaler, a correction value to or from the scaled logarithmic representation, the value corresponding to the logarithm function applied to the effective scaling factor in order to receive a representation with the logarithm taken of the calculation result as the signal energy,
  wherein at least one of the transformer, the processor, the logarithm taker and the rescaler comprises a hardware-implementation.

23. A non-transitory computer-readable medium having stored thereon a computer program with a program code for performing, when the computer program runs on a computer, the method for calculating a signal energy of an information amplitude signal, the method comprising
  decomposing an information amplitude signal into spectral values present in an x-bit representation with a logarithm not taken;
  performing a squaring at the x-bit representation with the logarithm not taken of each spectral value in order to receive one respective squared spectral value, and a summation at the squared spectral values in order to receive a sum of squares as a calculation result in a representation with the logarithm not taken, wherein the performing is executed such that the representation with the logarithm not taken of the calculation result is scaled with an effective scaling factor compared to the sum of squares;
  applying a logarithm function to y bits of the representation with the logarithm not taken of the calculation result in order to receive a scaled representation with the logarithm taken of the calculation result, wherein y is less than or equal to 2 times x; and
  adding or subtracting a correction value to or from the scaled logarithmic representation, the value corresponding to the logarithm function applied to the effective scaling factor in order to receive a representation with the logarithm taken of the calculation result as the signal energy.

* * * * *